Figure 1:
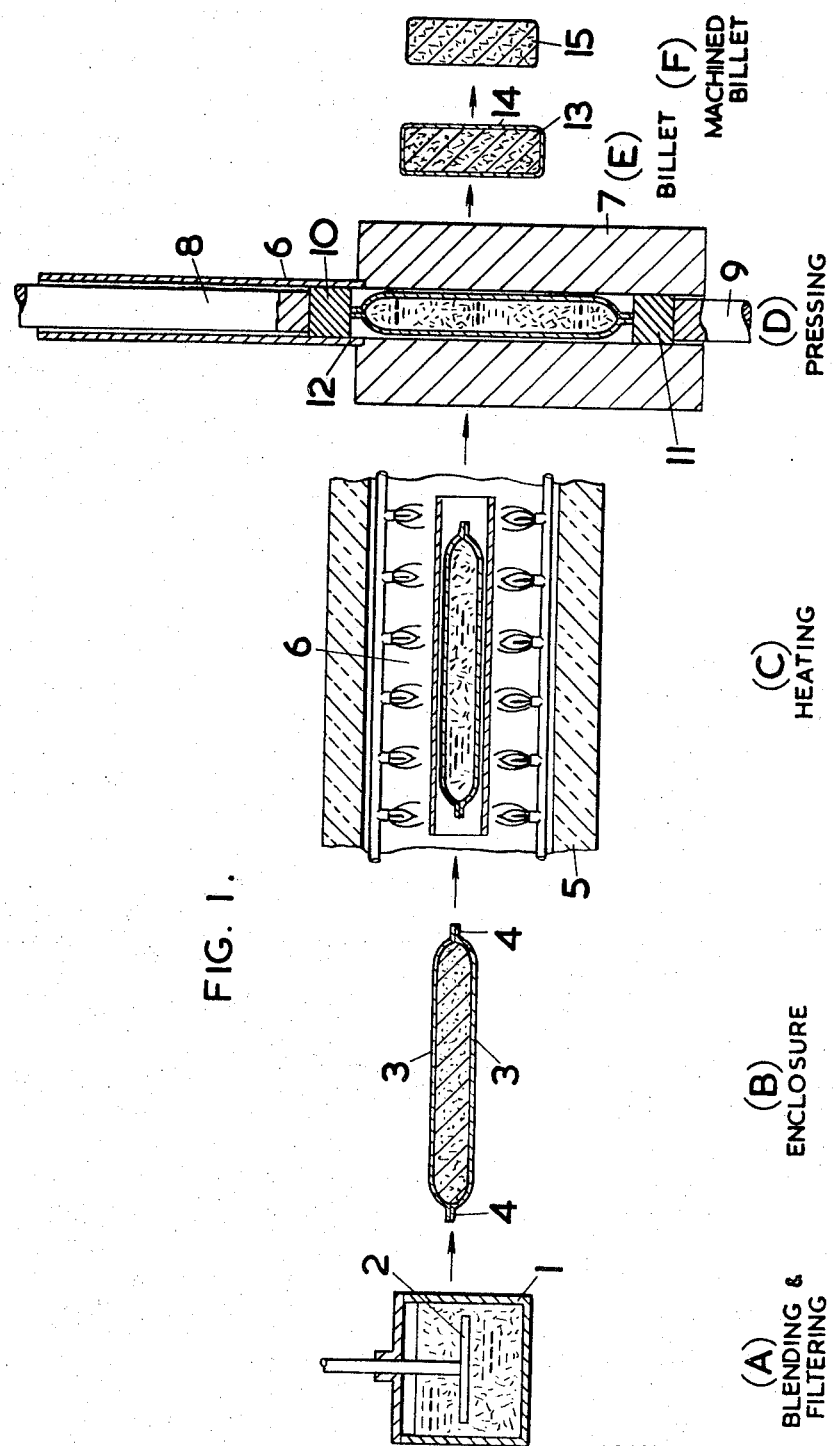

United States Patent
Cannell et al.

[15] 3,695,335
[45] Oct. 3, 1972

[54] PROCESS FOR MAKING COMPOSITE MATERIALS FROM REFRACTORY FIBERS AND METAL

[72] Inventors: John Corjeag Cannell, 76, Monkswood Ave., Waltham Abbey, Essex; Rodney Seymour Leaper, Silverburn, 3, Park View, Hoddesdon, Hertfordshire; Noel James Parratt, 18, Tycehurst Hill, Loughton, Essex, all of England

[22] Filed: Sept. 8, 1970

[21] Appl. No.: 70,455

[30] Foreign Application Priority Data

Sept. 10, 1969  Great Britain..........44,612/69

[52] U.S. Cl. ..................164/97, 164/112, 164/319
[51] Int. Cl. ...........................................B22d 19/02
[58] Field of Search........164/55, 59, 80, 91, 97, 112, 164/133, 319

[56] References Cited

UNITED STATES PATENTS

| | | |
|---|---|---|
| 1,950,356 | 3/1934 | DeBats ...................164/97 X |
| 1,956,907 | 5/1934 | Miller et al. ...............164/120 |
| 3,270,383 | 9/1966 | Hall et al. ..................164/120 |
| 3,364,975 | 1/1968 | Gruber ........................164/55 |
| 3,472,308 | 10/1969 | Lauth ....................164/120 X |
| 3,529,655 | 9/1970 | Garth ........................164/97 |
| 3,547,180 | 12/1970 | Cochran ..................164/97 X |
| 3,571,901 | 3/1971 | Sara.............................164/80 |

*Primary Examiner*—R. Spencer Annear
*Attorney*—Stevens, Davis, Miller & Mosher

[57] ABSTRACT

A process for the manufacture of a composite material comprises providing in a mould an admixture of reinforcing refractory fibers and a molten metal, applying to the admixture an encapsulating pressure program until a desired densification is achieved and at least during initial application of the encapsulating pressure program arranging adjacent each path of potential leakage from the mould a heat sink having a heat capacity sufficient to solidify molten metal contacting the heat sink and thereby seal the said leakage path.

20 Claims, 3 Drawing Figures

PROCESS FOR MAKING COMPOSITE MATERIALS FROM REFRACTORY FIBERS AND METAL

The invention relates to metallurgical processes in which a raw material having at least one particulate component is formed into an integral mass having useful properties. The present invention is particularly concerned with processes for the production of composite materials comprising a metal matrix reinforced with particulate materials such as the elongated single crystal fibers of refractory materials known as whiskers.

In recent years world wide interest and research effort has been concentrated on the manufacture of fibrous refractory materials which have tensile strengths of the order of millions of pounds per square inch. Appreciable quantities some of these materials — chiefly silicon carbide and silicon nitride whiskers and carbon fiber — are now available and attention is now being directed to utilizing their enormous strength to produce strong "composite" materials in which a matrix is greatly reinforced by the introduction of fibrous refractory material. A particularly attractive application is to the reinforcement of metal matrices with the general aims of greatly increasing the strength and stiffness of light but relatively weak, metals and/or extending the upper working temperature limits of metals by incorporating refractory fibers which will confer additional strength on the metals at temperatures where the intrinsic strength of the metal is seriously reduced.

The superficially straightforward task of producing reinforced metal composites has proved unexpectedly intractable and no commercially viable process producing such metal composites with more than a small fraction of their theoretical strength appears to have been described. Attempts to produce such materials by a variety of complex small-scale experimental procedures have been reported, however, and may be summarized as of two main types: a powder-metallurgical approach by the application of heat and pressure to an admixture of reinforcing fibers and particulate solid metal; and the infiltration of a reinforcing fiber mass with liquid metal. The former approach has been found to subject the brittle fibrous reinforcing material to extensive breakage and largely to negate any potential gain in strength. Both approaches have been hampered by the fact that in composite systems of practical interest the metal matrix fails to spread over the surface of the fibrous reinforcement, ie, the reinforcement surface is not 'wetted' by the metal. The composites resulting consequently are found to contain numerous voids and to have a very poor bonding between matrix and fibrous reinforcement and their properties generally are not significantly better than the unreinforced matrix metal. Some success has been obtained by the laborious procedure of coating individual reinforcing fibers with at least one coating of a vapor deposited metal so that the fibers are given a surface wettable by the desired matrix metal, but it is often found that the vapor deposited coating fails to adhere adequately to the fibers or, alternatively, that the hot matrix metal first dissolves the thin vapor deposited fiber coating and then suffers the non-wetting problems that the fiber coatings were designed to solve.

It is a major object of the present invention to provide a process for the production of valuable composite materials from refractory reinforcing fibers and non-wetting metal matrices, that is matrices of metals which in the molten state have a contact angle with the reinforcing fiber surface of at least 90°.

It is a further object of the invention to provide reinforced metal composite materials which are substantially void-free and which have the theoretical density calculated from the density of each of the components of the matrix.

It is another object of the invention to provide a process and apparatus for the production of reinforced metal composites which is susceptible of ready industrial application by automatic machinery thereby avoiding the expensive and time-consuming manual processes hitherto associated with composite materials.

It is a particular aim of the present invention to provide a composite material consisting of aluminum alloy reinforced with silicon carbide whiskers which has an ultimate tensile strength of 30–40 tons per square inch.

In its wider aspect, the present invention derives from our realization that a complex pressure/time relationship, which we term an encapsulation pressure program, should be applied to the admixed components of a reinforced metal composite in which the metal matrix is molten; and from our appreciation of how this relationship can be applied in a practical apparatus.

According to the present invention, a process for the manufacture of a composite material comprises providing in a mould an admixture of reinforcing refractory fibers and a molten metal, applying to the admixture an encapsulating pressure program until a desired densification is achieved and at least during the initial application of the encapsulating pressure program arranging adjacent each path of potential leakage from the mould a heat sink having a heat capacity sufficient to solidify molten metal contacting the heat sink and thereby seal the said leakage path. By molten metal is meant a mass of metal of which at least 30 percent and preferably 90 – 100 percent, is in the liquid phase.

The encapsulating pressure program can be considered as consisting of three stages. The first stage comprises application of an infiltration pressure which is sufficient to force molten metal around the fibrous reinforcement and to penetrate between adjacent fibers so that an interconnecting network of molten metal is produced around the fibers. The minimum infiltration pressure can be calculated approximately by surface tension theory, $p = T/r$, where $p$ is the pressure required to penetrate between parallel reinforcing fibers separated by a distance $2r$ for a mass of molten metal having a surface tension $T$. Thus for example, in a typical case of an aluminum alloy composite containing 20 percent by volume of silicon carbide whiskers having a diameter of about 0.7 microns the spacing between between the whiskers is of the order of 0.7 microns and the calculated infiltration pressure is about 500 pounds per square inch (p.s.i.) In practice it was found that successful infiltration was achieved with 500 p.s.i. but that 250 p.s.i. was insufficient.

The infiltration pressure should not greatly exceed and should generally not be more than twice the calculated value or there is a considerable chance that a large proportion of the brittle reinforcing fibers will be broken before they are surrounded by the 'protective' network of molten metal.

After the molten metal network is established by the infiltration pressure it is necessary to quickly apply a second stage of increased pressure to consolidate the composite by removing microscopic voids remaining in the composite by forcing molten metal into them and causing residual trapped gases to dissolve in the metal. This consolidation pressure will normally be at least twice the infiltration pressure and typically at least 2,000 psi, but much higher pressures up to 40,000 psi may be used although there is generally no advantage.

The third stage of the encapsulating pressure programme is applied during solidification of the composite and again should be in excess of 2,000 psi and generally as high as desired. This final pressure is applied to ensure that as the metal matrix solidifies and contracts, voids which might tend to open up within the composite are closed by deformation of the solidifying metal matrix.

The encapsulating pressure program can be carried out only if the necessary pressures can be applied in a controlled manner to the composite and, unfortunately, we have found that attempts to apply such pressures to molten metal/fibrous reinforcement systems results in intolerable leakages of molten metal from conventional dies leading to poorly consolidated, non-wetted porous products without significant reinforcement being achieved. We have found however that satisfactory pressure programs may be achieved by providing a 'self-sealing' mould in which molten metal seeking to escape along leakage paths is contacted by a heat sink which withdraws sufficient heat to solidify some of the metal and block the leakage path. Thus, for example, where pressure is applied by compression of a piston in a cylindrical mould the potential leakage paths will be between the piston and the mould sides and an appropriate heat sink is provided by ensuring that the piston is at a temperature sufficiently lower than the composite material and/or has an adequate heat capacity to solidify metal tending to leak past the piston. Normally, of course, it will be necessary only to provide the heat sink during the initial application of pressure to the composite since once the leakage paths are sealed the problem of maintaining pressure on liquid metal is usually overcome.

Where the heat sink is provided by a cooled piston, it is normally sufficient to cool the piston to a temperature which is up to about 100°C below the solidus temperature of the molten metal of the treated admixture. The amount of cooling is preferably the minimum essential to effectively seal potential leakage paths around the piston since excessive cooling can lead to premature solidification of metal within the admixture before the encapsulation pressure program achieves the desired densification. Excessive cooling will be apparent retrospectively due to the presence of voids in the resulting composite material or failure to reach the expected composite density. Excessive cooling can surprisingly, be prevented even when a cold mould and piston or one moderately heated to only 200° -- 400°C are used provided that the rate of loss of heat from the composite to the mould and piston is kept sufficiently low to permit the full encapsulation pressure programmes to be applied before complete solidification of the molten metal matrix occurs. In accordance with a feature of the invention, the heat loss from the composite during the application of the encapsulation pressure programme is kept sufficiently low by interposing a layer of thermal insulating material between the composite admixture in the mould and the face of the piston applying the pressure program to the composite. A suitable thermal insulating material is a layer of asbestos paper but, of course, it may be possible to use alternative materials. An additional assistance in reducing heat loss possibly may be provided by the use of a particulate carbon mould release agent between the mould sides and the composite.

The preferred apparatus for producing fiber reinforced composite materials in accordance with the invention comprises a mould closed by a piston acting directly upon an admixture of composite material components contained in the mould. We find it is essential to apply the encapsulation pressure programme direct to the composite in order to complete the programme before progressive solidification of the molten metal prevents effective pressure being applied throughout the composite. We suspect that prior art attempts to apply pressure remotely by pressure die casting techniques in which a molten metal is fed under high pressure into a mould containing reinforcing fibers may have failed in part because the onset of metal solidification near the mould inlet prevented the desired pressure of the liquid metal being applied throughout the mould.

There are several ways of providing the admixture of molten metal and fibrous refractory reinforcement in the mould, of which the preferred procedures are either to introduce a preheated admixture of molten metal and fibrous reinforcement into the mould or to place a mass of fibrous reinforcement in the mould and cover the mass with molten In in each case, of course, the encapsulation pressure programme must be begun as quickly as possible after the admixture has been introduced into the mould. The time available for the encapsulation pressure programme to be completed may be extended usefully in the case where molten metal is added to a mass of reinforcement in the mould by superheating the metal (that heating the metal well above its melting point) and/or preheating the fibrous reinforcement in the mould. Although it is possible to heat an admixture of finely-divided solid metal and fibrous reinforcement in situ in the mould in order to melt the metal component of the composite this is not normally desirable since considerable corrosion of the mould can take place during the comparatively long residence time of the molten metal in the mould essential to ensure melting throughout the admixture.

Composites may be formed in a mould closed by a piston both by batch and by semi-continuous processes. Semi-continuous processes may be operated by repetitively passing a preheated admixture of reinforcement and molten metal in the mould, applying encapsulating pressure and ejecting the composite. Alternatively, reinforcing fibers may be successively charged into the mould, covered with molten metal and subjected to the encapsulation pressure, the resulting composite being ejected and the process repeated.

It will be appreciated that the forms of mould and processing hereinbefore described are not limited to the production of billets of composite material from cylindrical moulds closed by a cylindrical piston, and can be applied readily to the manufacture of sheet and strip composite material by, for example, making the width of a mould considerably greater than its depth in the direction of applied encapsulating pressure.

Any useful reinforcement which is sufficiently compatible, i.e. not seriously reduced in reinforcing ability, with the metal matrix of the composite may be employed, and, in particular, ceramic fibers such as silicon carbide and silicon nitride whiskers or carbon fibers.

The processes of the present invention are particularly applicable to the formation of composite materials from metals reinforced by refractory whiskers such as silicon carbide whiskers.

Typical examples of processes in accordance with the invention will now be described with reference to the accompanying drawing in which:

FIG. 1 shows diagrammatically a process for the manufacture of a composite material in billet form.

Referring to FIg. 1, an intimate dispersion of particulate metal and reinforcing whiskers is formed in an inert liquid medium such as acetone in a blending vessel 1 equipped with an agitator disc 2 (Stage A). The dispersion is filtered to remove the liquid medium and the resulting dried admixture is packed between sheets of metal having a melting point higher than that of the particulate metal in the admixture. The edges 4 of the sheets are folded over to envelop and retain the admixture (Stage B) and the enclosed admixture is passed to a furnace 5 in which the admixture is heated to a temperature sufficient to ensure that the particulate metal component becomes molten (Stage C). It is normally necessary to further enclose the admixture in supporting sheath 6 for ease of handling and the resulting assembly is transferred to a mould 7 having pistons 8 and 9 faced with carbon at their working faces 10 and 11 respectively.

Conveniently the sheath 6 is arranged to locate with the mould 7 by insertion into recess 12 and piston 8 is passed through the sheath 6 firstly to eject the admixture from the sheath into the mould and secondly to apply the desired encapsulating pressure programme in opposition to the piston 9. Piston faces 10 and 11 act as heat sinks and are cooled relative to the admixture at least during the initial application of encapsulating pressure programme so that the potential paths of leakage past the pistons are sealed by the solidification of molten metal (Stage D). The pressure programme is continued until the desired densification, normally at least 95 percent and preferably as near as possible to the theoretical density of the composite, is achieved. The pressed billet 13 is removed from the mould (Stage E) has a residual skin 14 derived from the metal sheets initially used to enclose the admixture and this is finally removed, if desired, by machining (Stage F) to yield the billet 15 of uncontaminated composite material.

The process described is particularly applicable to continuous production in which conveyor systems continuously transport the material between treatment stages A to F and billet production proceeds at a rapid rate.

Figure 2:
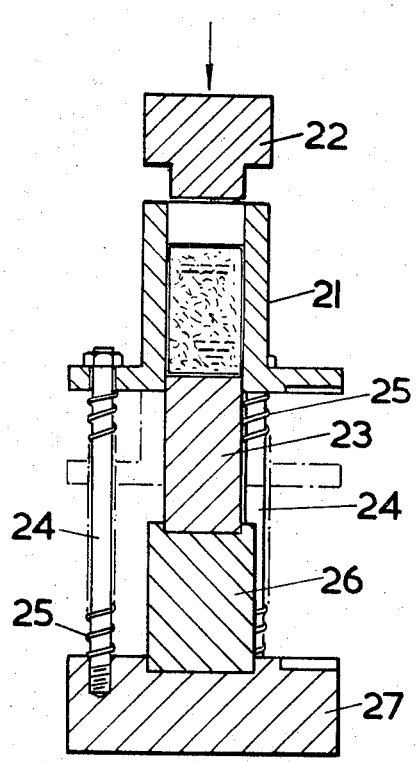
Figure 3:
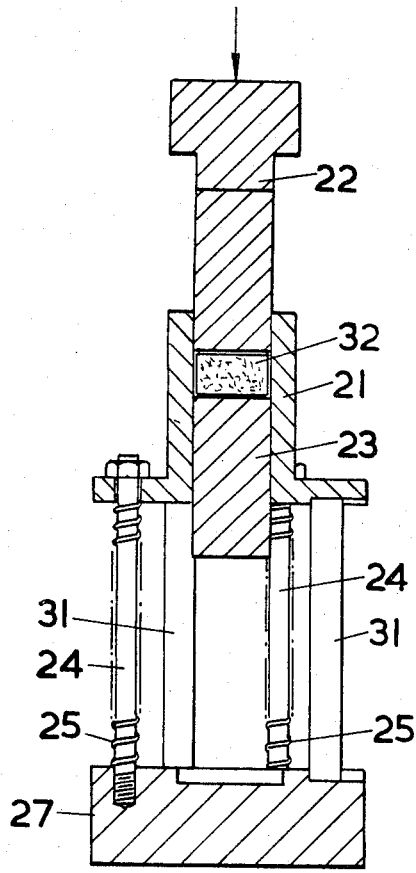

Several alternative procedures may be adopted to speed production, including direct filtration of a suspension of reinforcing fibers to form a cake or sheet which is broken into "crumbs" and interspersed with coarse alloy particles to give a dry admixture for Stage B. The construction and operation of a modified mould and piston assembly for producing cylindrical billets is shown in the accompanying drawings in which FIG. 2 shows a cross sectional view through the assembly prior to the application of the encapsulating pressure programme and FIG. 3 shows a cross-sectional view through the assembly prior to the ejection of a composite billet.

In the Figures, the assembly consists of a cylindrical mould 21 having opposing steel pistons 22 and 23. The mould is vertically moveable upon guides 24 and springs 25 act in opposition to hydraulic pressure applied to the upper piston 22. The lower piston 23 is mounted upon a removable support 26 seated in a base plate 27. In operation, the upper piston 22 is withdrawn from the entry to the mould and the charge of composite admixture introduced. The upper piston is then driven downward at an appropriate speed to subject the composite admixture to the desired encapsulation pressure programme against the reaction of the lower piston 23. The relative temperatures of the composite and the piston are adjusted appropriately - conveniently by heaters (not shown) around the mould — to ensure that the potential leakage paths are blocked by solidifying molten metal from the composite. After the encapsulation pressure programme has been applied and the composite has solidified, the composite is ejected as shown in FIG. 3. Referring to FIG. 3, the support 26 is removed and mould supports 31 are inserted and the upper piston 2 is lowered to force the composite billet 32 from the mould.

Process in accordance with the invention will now be illustrated by particular examples of the manufacture of cylindrical billets consisting of a composite of aluminum alloy and silicon carbide whiskers.

EXAMPLE 1

Eighty two parts aluminum alloy (RR58, product of High Duty Alloys Ltd) in a finely divided form (passing 100 B.S.S. Mesh were admixed with 18 parts by weight of a particulate reinforcement consisting of silicon carbide whiskers (having an aspect ratio of between 5:1 and 50:1), the admixture being carried out in an agitated acetone suspension. The resulting intimate admixture was filtered free of acetone and packed after drying into a cylinder of pure aluminum foil having a thickness of approximately 10 microns. The ends of the cylinder were folded over to envelop and contain the admixture and the enclosed admixture supported in a steel guide tube was passed into a furnace operating at approximately 660°C. The aluminum alloy powder (melting point 630°C) was enclosed by the pure aluminum foil (melting point 667°C). The admixture of reinforcement and molten metal was then passed quickly into a mould having cooled pistons as hereinbefore described with reference to FIG. 1 and an encapsulating pressure programme of about 500 psi for about 0.2 seconds followed by 2,000 psi increasing to 3 tons per square inch was applied. The admixture is compressed to about one-third of its original length. Aluminum alloy tending to leak past the pistons was quickly solidified during the pressing by piston temperatures initially cooled to about 300°C and no difficulty was found in maintaining full moulding pressure. The resulting billet was found to have a density of 2.823 corresponding to the theoretically maximum density available from a composite of the alloy (density 2.745) and silicon carbide whiskers (density 3.18). Metallurgical examination showed that the composite was substantially void-free and that the reinforcing whiskers were substantially completely wetted by the aluminum alloy.

EXAMPLE 2

The procedure of example 1 was repeated using as the alloy Type 7075 (Aluminum Corporation of America) which has a density of 2.76. The resulting composite had a density of 2.834 which corresponds to the theoretical maximum for the composite. The composite was again substantially void-free and completely wetted.

EXAMPLE 3

20 parts by weight of one-fourth inch chopped lengths of a strand of silicon carbide whiskers (produced by the process described in British Pat. No. 1,128,321 as a one-half mm. aligned strand by extrusion in an alginate carrier), composed of whiskers having a mean diameter of 2 microns was intimated by dry mixed with 80 parts of finely divided (passing 100 B.S.S. Mesh) aluminum alloy (RR58 — product of High Duty Alloys Ltd.). The resulting admixture was heated and compressed as described in Example 1 to give composite material having the theoretical maximum density, which was substantially void-free, and wherein the reinforcing whiskers were substantially completely wetted by the alloy.

EXAMPLE 4

Chopped carbon fibers (one-fourth inch lengths having an average tensile strength of $0.3 \times 10^6$ psi and diameters of the order of 7 microns) were filtered from suspension to give a mat of fibers and these were broken into crumbs and introduced into the mould. Aluminum alloy (RR58) superheated to about 800°C was poured onto the carbon fibers in the mould in the proportion 90 parts by weight alloy to 10 parts by weight carbon fiber and the admixture was subjected to the encapsulation pressure programme as described in Example 1. The resulting composite had the theoretical maximum density and was substantially void-free and the reinforcing fibers were substantially completely wetted by the alloy.

As cast billets formed by the processes described in Examples 1 – 3 were extruded through a circular die at an extrusion ratio of 10:1 and the extruded composites were tested for strength at room temperature and give maximum values of ultimate tensile strength between 30 and 40 tons per square inch and compressive strengths of 45 – 55 tons per square inch. These values compare favorably with the ultimate tensile strengths of the typical metal matrices aluminum, 5 – 10 tons per (RRinch, and aluminum alloy control (rr58) 20 – 25 tons per square inch.

Although the present invention has been described with particular reference to composite materials in which the reinforcing material is a refractory fiber, the processes of the invention may be readily applied to other reinforcements e.g. particles and powders, where the matrix is non-wetting and may even be applied with advantage to composite systems in which the reinforcement is wetted, but other fabrication problems have been encountered. Similarly, although the present invention has been exemplified with metal matrices of aluminum alloys, any selected metal matrix may be used by adjustment of the processing temperatures.

We claim:

1. A process for the manufacture of a composite material which comprises providing in a mould an admixture of reinforcing refractory fibers and a molten metal, applying to the admixture an encapsulating pressure program until a desired densification is achieved, said encapsulating pressure program comprising:
   a first stage of infiltration pressure sufficient to force molten metal around the fibrous reinforcement to form an interconnecting network of molten metal;
   a second stage of increased pressure to consolidate the composite by removing microscopic voids remaining in the composite by forcing molten metal into them and causing residual trapped gases to dissolve in the metal;
   a third stage of pressure sufficient to ensure that as the molten matrix metal solidifies and contracts voids which tend to open as a result of metal contraction within the composite are closed by deformation of the metal matrix; and at least during initial application of the encapsulating pressure program arranging adjacent each path of potential leakage from the mould a heat sink having a heat capacity sufficient to solidify molten metal contacting the heat sink and thereby seal the leakage path.

2. A process according to claim 1 wherein the encapsulating pressure program is applied by a piston acting upon the admixture in the mould.

3. A process according to claim 2 wherein the piston is maintained at about 100° C below the solidus temperature of the molten metal during the initial application of the encapsulating pressure program to solidify molten metal tending to escape through leakage paths around the piston.

4. A process according to claim 2 wherein excessive cooling of the admixture prior to completion of the encapsulating pressure program is prevented by introducing a thermally insulating material between the admixture and the piston applying encapsulating pressure.

5. A process according to claim 4 and in which excessive cooling is additionally prevented by the presence of a particulate mould release agent between the mould sides and the admixture.

6. A process according to claim 4 wherein the mould and piston are unheated before the admixture is provided in the mould.

7. A process according to claim 4 wherein the mould is heated to between about 200° C and 400° C before the admixture is provided in the mould.

8. A process according to claim 1 wherein the admixture of reinforcing refractory fibers and metal are introduced into the mould as a preheated admixture of molten metal and fibers.

9. A process according to claim 8 wherein the preheated admixture is introduced into the mould contained within an envelope of metal which is solid at the pre-heating temperature.

10. A process according to claim 1 wherein the admixture of reinforcing refractory fibers and molten metal are provided in the mould by first introducing a mass of reinforcing fibers into the mould and then covering the mass with a charge of molten metal.

11. A process according to claim 10 wherein the molten metal is superheated above its melting point in order to delay the solidification of the admixture.

12. A process according to claim 10 wherein the mass of reinforcing fibers in the mould is preheated prior to the introduction of molten metal.

13. A process for the manufacture of a composite material which comprises providing in a mould an admixture of particulate reinforcing material and a molten metal, applying to the admixture an encapsulating pressure program until a desired densification is achieved, said encapsulating pressure program comprising:

a first stage of infiltration pressure sufficient to force molten metal around the particulate reinforcement material to form an interconnecting network of molten metal;

a second stage of increased pressure to consolidate the composite by removing microscopic voids remaining in the composite by forcing molten metal into them and causing residual trapped gases to dissolve in the metal;

a third stage of pressure sufficient to ensure that as the molten matrix metal solidifies and contracts voids which tend to open as a result of metal contraction within the composite are closed by deformation of the metal matrix;

and at least during initial application of the encapsulating pressure program arranging adjacent each path of potential leakage from the mould a heat sink having a heat capacity sufficient to solidify molten metal contacting the heat sink and thereby seal the leakage path.

14. A process according to claim 1 wherein the first stage infiltration pressure lies between the minimum value calculated from surface tension theory and twice that value.

15. A process according to claim 14 wherein the infiltration pressure is between about 500 psi and 1,000 psi.

16. A process according to claim 1 wherein the second stage consolidation program is between about 2,000 psi and 40,000 psi.

17. A process according to claim 1 wherein the third stage pressure is at least 2,000 psi.

18. A process according to claim 1 wherein the molten metal matrix is non-wetting in contact with the reinforcing fiber surface.

19. A process according to claim 1 wherein the molten metal matrix is an aluminum alloy.

20. A process according to claim 1 wherein the refractory reinforcing fiber is selected from the group consisting of silicon carbide and silicon nitride whiskers and carbon fibers.

* * * * *